United States Patent
Murakami et al.

(10) Patent No.: US 7,328,631 B2
(45) Date of Patent: Feb. 12, 2008

(54) VEHICULAR STEERING APPARATUS

(75) Inventors: Tetsuya Murakami, Nara (JP); Hiroaki Shinto, Nara (JP); Shuzo Hirakushi, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 3 days.

(21) Appl. No.: 11/240,522

(22) Filed: Oct. 3, 2005

(65) Prior Publication Data

US 2006/0022446 A1 Feb. 2, 2006

Related U.S. Application Data

(62) Division of application No. 10/421,734, filed on Apr. 24, 2003, now Pat. No. 6,981,430.

(30) Foreign Application Priority Data

May 13, 2002 (JP) .............................. 2002-137482

(51) Int. Cl.
  *B62D 1/18* (2006.01)
(52) U.S. Cl. ........................................ 74/493; 280/775
(58) Field of Classification Search ................ 74/560, 74/492, 493, 473.3, 512; 280/777, 775
See application file for complete search history.

(56) References Cited

U.S. PATENT DOCUMENTS

| | | | |
|---|---|---|---|
| 4,244,237 A | 1/1981 | Sprunger | |
| 4,774,851 A | 10/1988 | Iwanami et al. | |
| 4,901,592 A | 2/1990 | Ito et al. | |
| 5,115,691 A | 5/1992 | Beauch | |
| 5,954,363 A * | 9/1999 | Cymbal et al. | 280/777 |
| 5,961,146 A | 10/1999 | Matsumoto et al. | |
| 6,170,874 B1 | 1/2001 | Fosse | |
| 6,183,012 B1 * | 2/2001 | Dufour et al. | 280/777 |
| 6,378,903 B1 * | 4/2002 | Yabutsuka et al. | 280/777 |
| 6,439,607 B1 * | 8/2002 | Jurik et al. | 280/777 |
| 6,523,432 B1 | 2/2003 | Yamamoto et al. | |
| 6,575,497 B1 * | 6/2003 | McCarthy et al. | 280/777 |
| 7,240,922 B2 * | 7/2007 | Nakano et al. | 280/777 |

FOREIGN PATENT DOCUMENTS

| | | | |
|---|---|---|---|
| EP | 1083109 | * | 3/2001 |
| EP | 1083109 A2 | * | 3/2001 |
| FR | 0 800 978 A | | 10/1997 |
| GB | 2340086 | | 2/2000 |

* cited by examiner

*Primary Examiner*—Richard Ridley
*Assistant Examiner*—Matthew A. Johnson
(74) *Attorney, Agent, or Firm*—Rabin & Berdo, PC

(57) ABSTRACT

A vehicular steering apparatus includes a column bracket secured to a steering column; and a fixing bracket secured to a vehicle body. The column bracket includes a top plate and a pair of side plates. The fixing bracket supports the column bracket via a support shaft. A support-shaft through hole formed in each of the side plates of the column bracket includes a slot extended along a longitudinal direction of the steering column. A resilient member is interposed between the top plate of the column bracket and a confronting portion of the support shaft. The resilient member biases the support shaft along a predetermined biasing direction to restrict play of the support shaft in the slot.

4 Claims, 8 Drawing Sheets

VEHICULAR STEERING APPARATUS

This is a Divisional of U.S. application Ser. No. 10/421,734, filed Apr. 24, 2003 now U.S. Pat. No. 6,981,430, the subject matter of which is incorporated herein by reference.

BACKGROUND OF THE INVENTION

1. Field of the Invention

The present invention relates to a vehicular steering apparatus.

2. Description of Related Art

A vehicular steering apparatus featuring a shock absorbing function includes, for example, a type wherein during a collision, a steering column is adapted to be bodily moved toward a front side of a vehicle body along a longitudinal direction of the steering column.

On the other hand, a steering apparatus permitting a positional adjustment of a steering wheel with respect to the longitudinal direction of the steering column includes a type wherein the whole body of the steering column to be adjusted is moved relative to the vehicle body along the longitudinal direction of the steering column.

The steering column assemblies of the former and latter types normally have an arrangement wherein a fixing bracket secured to the vehicle body has a pair of side plates, whereas a column bracket secured to the steering column is disposed between the pair of side plates of the fixing bracket. The side plates of the column bracket are each formed with a slot extended along the longitudinal direction of the steering column. A support shaft inserted through the slots is fixed to the fixing bracket. Thus, the support shaft is allowed to move along the slot when the steering column is moved relative to the vehicle body.

In order to permit the movement of the support shaft along the slot, however, a predetermined clearance need be provided between an outer periphery of the support shaft and a circumferential edge of the slot. This may result in an unwanted play or poor fit of the steering column.

Therefore, it is a common practice to fit a resin collar for poor-fit elimination on the periphery of the support shaft so that an outer periphery of the resin collar is fitted in the slot. Unfortunately, an influence of varied dimensional tolerances of individual components may lead to a problem that the resin collar is strongly compressed between the circumferential edge of the slot and the outer periphery of the support shaft, or conversely that a clearance is produced between the outer periphery of the collar and the circumferential edge of the slot, resulting in the play of the steering column.

The former problem includes an increased resistance to the movement of the support shaft along the slot. This may lead to a failure of ensuring a required amount of shock-absorbing stroke because the steering column being moved to absorb an impact energy may be arrested at some midpoint of the shock-absorbing stroke. Furthermore, an increased manipulation force may be required for adjusting the position of the steering wheel with respect to the longitudinal direction of the steering column.

In view of the foregoing, it is an object of the invention to provide a vehicular steering apparatus adapted to prevent the play of the steering column and to ensure a stable resistance to the relative movement between the slot and the support shaft.

SUMMARY OF THE INVENTION

According to a preferred embodiment of the invention for achieving the above object, there is provided a vehicular steering apparatus comprising: a column bracket secured to a steering column including a top plate and a pair of side plates; a fixing bracket secured to a vehicle body and including a pair of side plates each of which confronts a face of a corresponding one of the side plate pair of the column bracket; a support shaft supported by the fixing bracket while supporting the column bracket; and a support-shaft through hole formed in each of the side plates of the column bracket and the fixing bracket for insertion of the support shaft therethrough; wherein the support-shaft through holes of the side plates of the column bracket each include a slot extended along a longitudinal direction of the steering column for permitting the support shaft to move relative thereto along the longitudinal direction of the steering column; the steering apparatus further comprising a resilient member interposed between the top plate of the column bracket and a confronting portion of the support shaft and serving to bias the support shaft in a predetermined biasing direction to restrict play of the support shaft in the slot.

According to the embodiment, the support shaft is biased by a resilient repulsive force of the resilient member whereby the play of the steering column is obviated. As a result, the occurrence of noises and the like can be prevented. In addition, the resilient member is disposed out of the slots so that the resilient member may be disposed at place where there is enough room therefor. Accordingly, it is not so difficult to accomplish a required amount of deformation of the resilient member for obviating the play of the steering column. This results in a stable resistance to the relative movement between the slot and the support shaft.

DETAILED DESCRIPTION OF THE PREFERRED EMBODIMENTS

Hereinafter, vehicular steering column assemblies according to preferred embodiments of the invention will be described with reference to the accompanying drawings.

Figure 1:
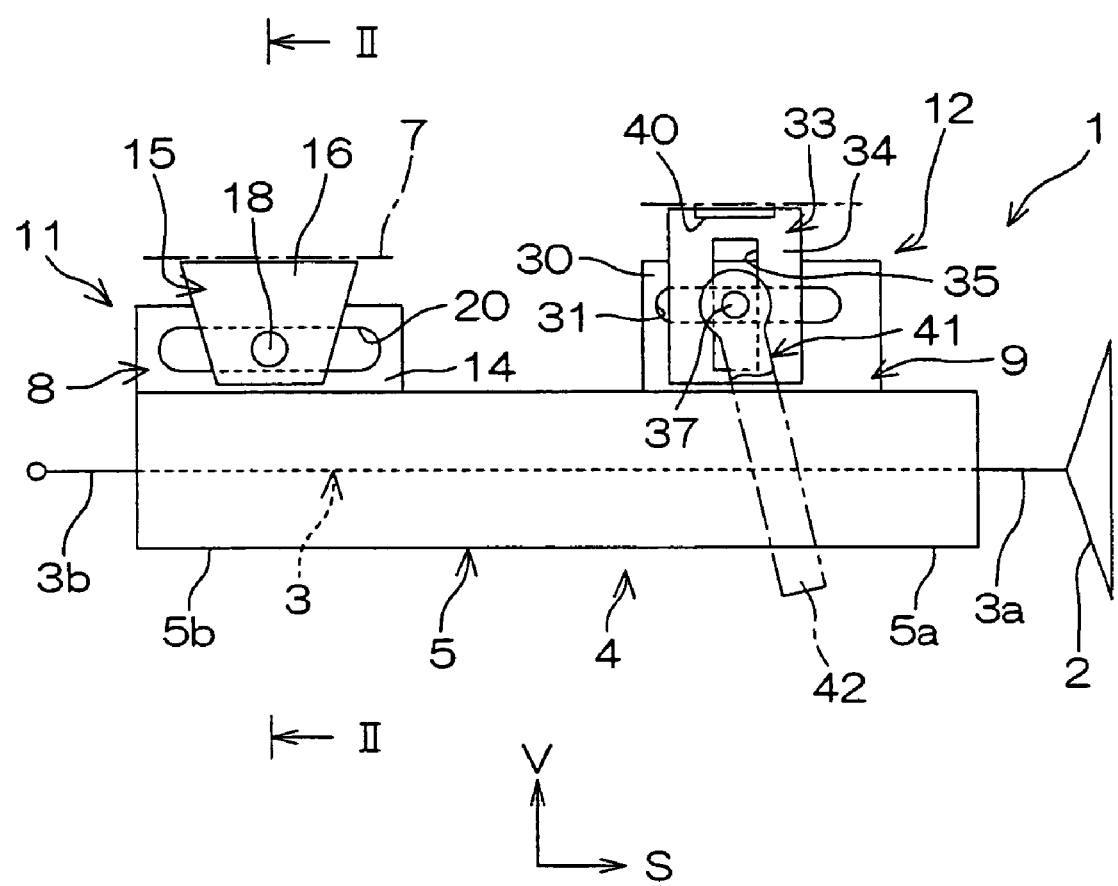
FIG. 1 is a schematic side view showing a vehicular steering apparatus according to one embodiment of the invention.

Referring to FIG. 1, a steering apparatus 1 includes a steering shaft 3 for transmitting a motion of a steering wheel 2 for steering dirigible wheels (not shown); and a steering column 4 rotatably supporting the steering shaft 3 extended therethrough. The steering wheel 2 is connected with a first end 3a of the steering shaft 3. A second end 3b of the steering shaft 3 is connected with a steering mechanism including a pinion, a rack shaft and the like, via an intermediate shaft not shown.

The steering mechanism may employ any other known mechanism. When the steering wheel 2 is turned, the rotation thereof is transmitted to the steering mechanism via the steering shaft 3, a universal joint, an intermediate shaft and the like so that the dirigible wheels can be steered.

The steering apparatus 1 is assembled to a vehicle body 7 (a part thereof is indicated by a dot-dash line) in a manner, for example, that the steering column 4 is inclined along a longitudinal direction S thereof with respect to an anteroposterior direction of the vehicle body while positioning the steering wheel 2 at an elevated side. However, the figure depicts the longitudinal direction S along a horizontal line for simplicity.

The steering column 4 has a cylindrical column jacket 5 for rotatably supporting the steering shaft 3. First and second ends 5a, 5b of the column jacket 5 correspond to the first and second ends 3a, 3b of the steering shaft 3, respectively.

The steering column 4 is provided with a lower column bracket 8 and an upper column bracket 9 for mounting the column jacket 5 to the vehicle body 7. The lower column bracket 8 is secured to the second end 5b of the column jacket 5, whereas the upper column bracket 9 is secured to place near the first end 5a of the column jacket 5.

The column jacket 5 houses a most part of the steering shaft 3 and rotatably carries the steering shaft by means of a plurality of, say two bearings (not shown) as axially positioning the steering shaft. It is noted that the column jacket 5 may consist of a plurality of members. In addition, at least either one of the lower column bracket 8 and the upper column bracket 9 may be formed integrally with the column jacket 5 to constitute a single member.

The steering apparatus 1 further includes two support structures 11, 12 for supportably fixing the steering column 4 to the vehicle body 7.

Figure 2:
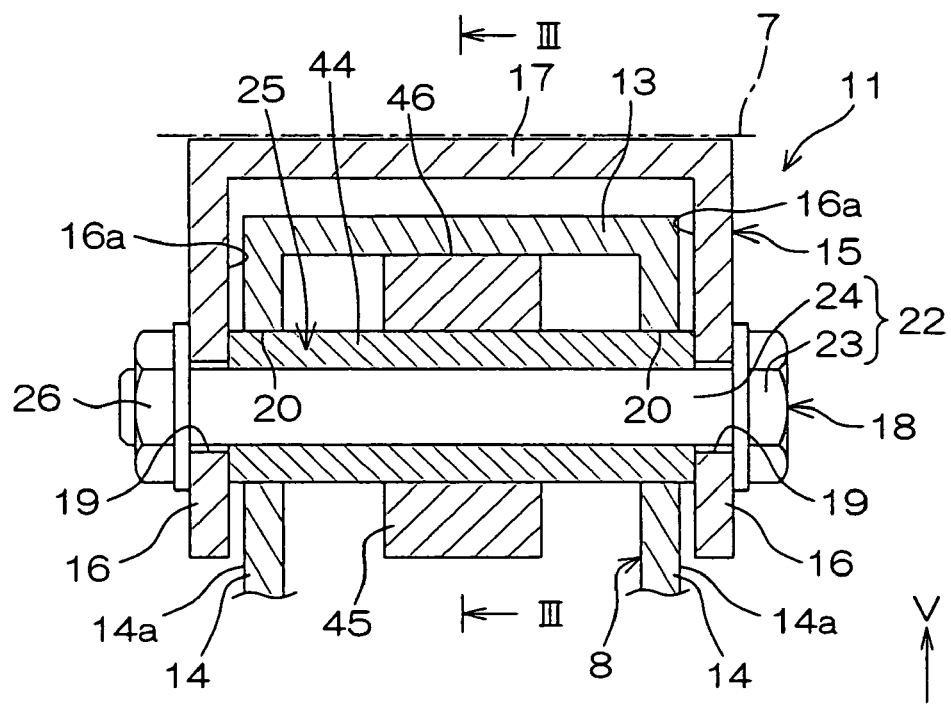
FIG. 2 is a sectional view taken on the line II-II in FIG. 1 for showing a part of a support structure of the steering apparatus.

As shown in FIGS. 1 and 2, the support structure 11 includes the lower column bracket 8 secured to the steering column 4 and defining a groove shape including a top plate 13 and a pair of side plates 14; a lower fixing bracket 15 having a pair of side plates 16 sandwiching the lower column bracket 8 therebetween, and secured to the vehicle body 7; and a support shaft 18 extending through these side plates 14, 16.

The lower fixing bracket 15 further includes a connecting plate 17 interconnecting opposite ends of the side plate pair 16. The lower fixing bracket 15 is secured to the vehicle body 7 via the connecting plate 17 by way of bolts (not shown). The pair of side plates 16 of the lower fixing bracket 15 each confront an outside face 14a of a corresponding one of the side plates 14 of the lower column bracket 8. The pair of side plates 16 of the lower fixing bracket 15 are each formed with a circular through hole 19, whereas the pair of side plates 14 of the lower column bracket 8 are each formed with a slot 20 for insertion of the support shaft therethrough. The slot 20 extends along the longitudinal direction S of the steering column 4.

The support shaft 18 includes a hollow outer shaft 25, and an inner shaft 22 coaxially inserted through the outer shaft 25. The outer shaft 25 is interposed between the pair of side plates 16 of the lower fixing bracket 15 and inserted through the slots 20, as the support-shaft insertion hole, in the pair of side plates 14 of the lower column bracket 8. The outer shaft 25 presents a pair of opposite ends thereof to corresponding inside faces 16a of the side plates 16.

The inner shaft 22 is a threaded stem having a head 23 at one end thereof and a threaded portion at the other end thereof. The inner shaft 22 extends through the support-shaft through holes 19 in the pair of side plates 16 of the lower fixing bracket 15 and the hollow outer shaft 25.

The pair of side plates 16 of the lower fixing bracket 15 and the hollow outer shaft 25 are integrally held onto a portion between a nut 26 fitted on the threaded portion at the other end of the inner shaft 22 and the head 23 thereof. Specifically, the outer shaft is restricted from moving axially of the support shaft 18 as held between the opposite side plates 16 of the lower fixing bracket 15.

Although a structure omitting the outer shaft 25 may be contemplated, the embodiment is described by way of the example where the outer shaft 25 is provided.

The lower fixing bracket 15 supports the lower column bracket 8 by way of the support shaft 18 including the inner shaft 22 and the outer shaft 25. The support shaft 18 pivotally supports the steering column 4 via the lower column bracket 8. That is, the support shaft 18 functions as a tilt axis or a pivot shaft for tilt adjustment of the steering column 4.

The lower fixing bracket 15 supports the support shaft 18 in a manner to permit the support shaft 18 to move relative to the steering column 4 along the longitudinal direction S thereof.

As shown in FIG. 1, the support structure 12 includes the upper column bracket 9 secured to the steering column 4 and including a pair of side plates 30; an upper fixing bracket 33 having a pair of side plates 34 sandwiching the upper column bracket 9 therebetween and secured to the vehicle body 7; and a support shaft 37 extending through the side plates 30, 34 of the brackets 9, 33.

The upper fixing bracket 33 is supported by the vehicle body 7 via a coupling member 40. The pair of side plates 34 of the upper fixing bracket 33 are each formed with a vertically elongated support-shaft through hole 35. The support-shaft through hole 35 extends along a direction V orthogonal to the longitudinal direction of the steering column 4.

The pair of side plates 30 of the upper column bracket 9 are each formed with a horizontally elongated support-shaft through hole 31. The support-shaft through hole 31 extends along a direction parallel to the longitudinal direction S of the steering column 4.

The support shaft 37 extends through the vertically elongated through holes 35 and the horizontally elongated through holes 31 so as to interconnect the brackets 9, 33. Thus, the upper column bracket 9 and the upper fixing bracket 33 are allowed to move relative to each other along the directions of the support-shaft through holes 35, 31.

The support shaft 37 is provided with a lock mechanism 41 for releasably holding the brackets 9, 33 in a tilt-lock state to inhibit the relative movements of the brackets 9, 33.

The lock mechanism 41 includes an operation lever 42 turned about an axis of the support shaft 37 to switch the brackets between the tilt-lock state and the released state; and a cam mechanism (not shown) which is operatively associated with the turning of the operation lever 42 so as to press the corresponding side plates 30, 34 of the brackets 9, 33 against each other for establishing the tilt-lock state. The lock mechanism 41 may employ any known mechanism for pressing the side plates 30, 34 against each other.

When the operation lever 42 is turned in a predetermined direction, the cam mechanism establishes the tilt-lock state by pressing the side plates 30, 34 of the brackets 9, 33 against each other, so that the steering column 4 is retained with a given retention force. The tilt-lock state may be canceled by turning the operation lever 42 in the opposite direction to the predetermined direction.

The released state permits the implementation of the tilt adjustment function to adjust the height of the steering wheel 2 by pivotally moving the steering column 4 about the support shaft 18 as the tilt axis; and a function to adjust the longitudinal position of the steering wheel 2 by slidably moving the steering column 4 along the lingitudinal direction of the steering column 4 being guided by the support shaft 37 and the support shaft 18.

The steering apparatus 1 of the invention also has an shock absorbing capability to absorb an impact energy of a driver (operator) striking the steering wheel 2 during a collision. Specifically, the coupling member 40 of the support structure 12 has, for example, a so-called capsule structure. The coupling member 40 normally retains the upper fixing bracket 33 onto the vehicle body 7 with a predetermined retention force such as to constrain the bracket 33 in place. During a collision, however, the coupling member 40 permits the upper fixing bracket 33 to move relative to the vehicle body 7 toward the front side thereof. Thus, the steering column 4 is moved toward the front side of the vehicle body so that the impact energy of the collision is absorbed. Instead of the capsule structure, the coupling member 40 may employ any other known structure that connects the steering column with the vehicle body 7 in a manner to permit the relative movement of the steering column during a collision.

When the steering column 4 is moved relative to the vehicle body 7 along the longitudinal direction S, the support shafts 18 and 37 are guided by the corresponding slots 20, 31. In the normal adjustment of the longitudinal position of the steering column 4, both the support shafts 18, 37 are allowed to move as guided within positional adjustment regions of the corresponding slots 20, 31. During the absorption of an impact energy, both the support shafts 18, 37 are introduced into respective impact absorption regions closer to the steering wheel 2 than the positional adjustment regions, so as to be moved in the respective impact absorption regions.

Figure 3:
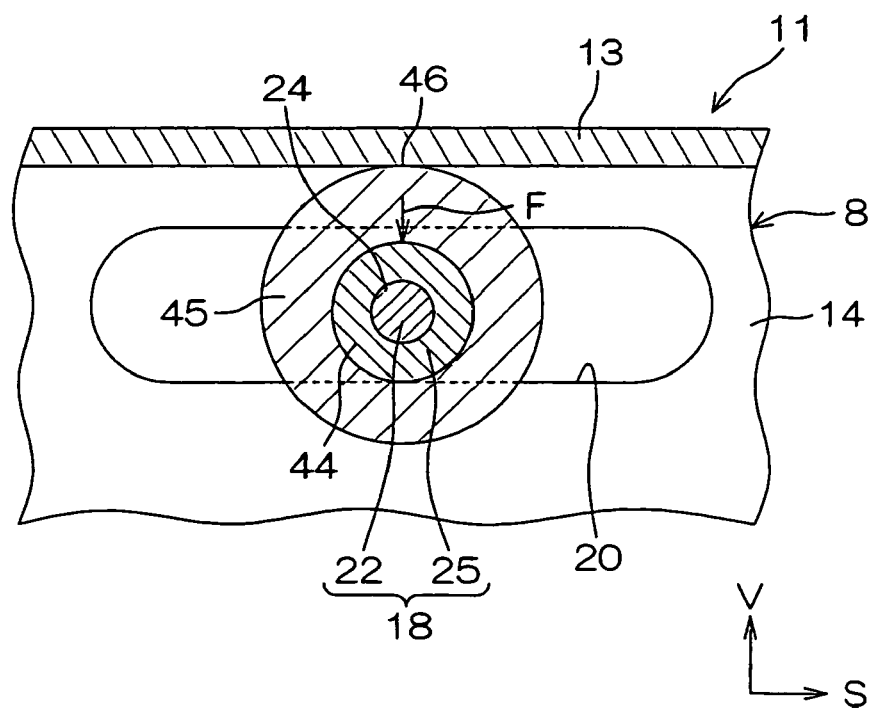
FIG. 3 is a sectional view taken on the line III-III in FIG. 2 for showing a part of the support structure of the steering apparatus.

According to the embodiment, an annular member 45 as a resilient member is fitted on, for example, a periphery of an axially intermediate portion 44 of the outer shaft 25 of the support shaft 18, as shown in FIGS. 2 and 3. The annular member 45 is interposed between the top plate 13 of the lower column bracket 8 and the outer shaft 25 as a confronting portion of the support shaft 18, and elastically biases the support shaft 18 in a predetermined biasing direction F to restrict a radial play of the support shaft 18 in the slot 20 or of the outer shaft 25.

In the embodiment, the radial play of the support shaft 18 means play along the direction V substantially orthogonal to the longitudinal direction S of the steering column 4. The predetermined biasing direction F to restrict such a play may be a direction to intersect a plane including the longitudinal direction S of the steering column 4 and an axial direction of the support shaft 18. What is important is that the annular member 45 as the resilient member biases the support shaft 18 along such a direction.

The annular member 45 may be formed in a cylindrical shape using a known elastic material such as rubber, resin or the like. The outer shaft 25 of the support shaft 18 is inserted through a hole of the annular member 45, an outer periphery 46 of which is in contact with an inside surface of the top plate 13.

The annular member 45 is radially compressed at its portion clamped between the axially intermediate portion 44 of the outer shaft 25 and the top plate 13, the compressed portion producing an elastic restoring force acting to return the annular member to a non-compressed state. Because of the above elastic restoring force, the annular member 45 biases the outer shaft 25 of the support shaft 18 away from the top plate 13. Thus, the outer shaft 25 is pressed against a circumferential edge of the slot 20 while both the brackets 8, 15 are biased in opposite directions.

The annular member 45 is relatively rotatably fitted around the outer shaft 25 and carried on the support shaft 18. The support shaft 18 and the annular member 45 are unitarily movable relative to the steering column 4.

It may be contemplated to design the annular member 45 to be held onto the outer shaft 25 as restricted from rotating relative to the outer shaft. It is also possible to use an O ring as the annular member 45. This is a convenient way to obtain an working effect of the annular member 45.

The resilient member is not limited to the annular member 45. For instance, the annular member 45 may be replaced by any one of the following members illustrated in FIGS. 4 to 11. The annular member 45 or any one of the following members may be used alone. Otherwise, plural members of different types or of one type may be used. What is needed is to employ at least one resilient member. The following description on the modifications of the invention focuses on differences from the above embodiment while like components to those already described are represented by the same reference numerals, respectively.

Figure 4:
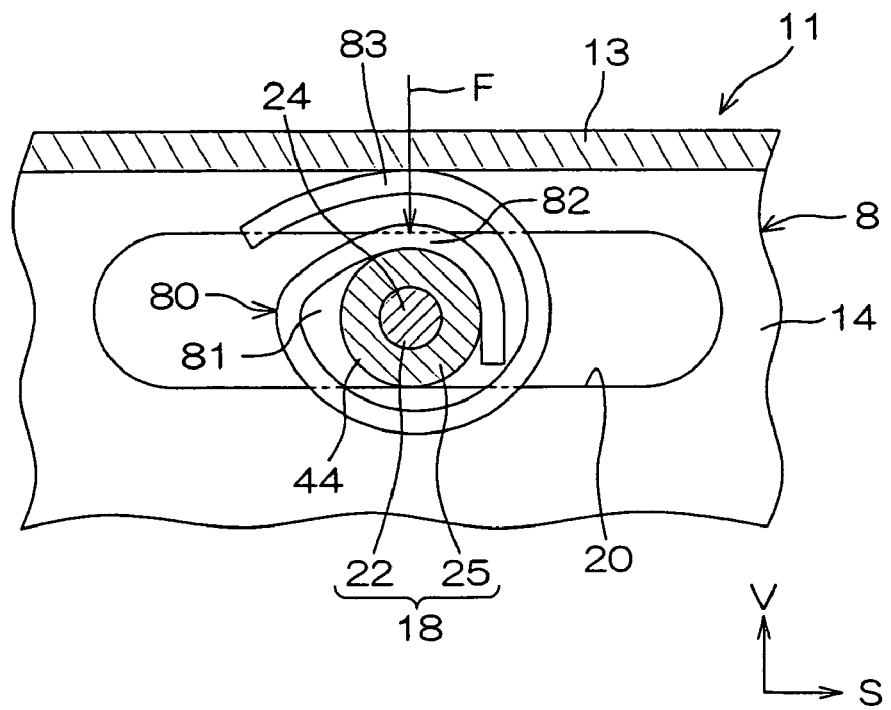
FIG. 4 is a sectional view showing a principal part of a vehicular steering apparatus according to another embodiment of the invention and particularly illustrating an exemplary modification of a resilient member.

According to FIG. 4, a spiral spring 80 is provided as the resilient member. The spiral spring 80 is constructed from an elongate sheet metal of a known resilient material such as a spring steel, which is substantially worked into a spiral shape. The spiral spring 80 has the spiral shape as viewed along the axis of the support shaft 18 and a predetermined width with respect to the axial direction of the support shaft 18. The spiral spring 80 internally defines a cavity 81 surrounding the outer shaft 25 of the support shaft 18. The support shaft 18 extends through the cavity 81, thereby retaining thereon the spiral spring 80.

The spiral spring 80 has a first portion 82 defined near a center of the spiral shape, and a second portion 83 defined by an outer circumference portion of the spiral shape. The first portion 82 is in contact with the outer shaft 25 of the support shaft 18, whereas the second portion 83 is in contact with the top plate 13.

The spiral spring 80 is retained by the support shaft 18 in a manner that the spiral spring is pressurized to bring its first and second portions 82, 83 into close face-to-face relation.

Hence, the spiral spring 80 produces a resilient restoring force acting to move the first and second portions 82, 83 thereof away from each other, thereby biasing the support shaft 18 along a predetermined biasing direction F to move the support shaft 18 away from the top plate 13.

The spiral spring 80 has an outward configuration substantially of an ellipse and is so positioned as to align a greater diameter of the elliptical shape with the longitudinal direction S of the steering column 4. This provides for an autonomous control of the position of the spiral spring 80 such that the first and second portions 82, 83 thereof are aligned on a smaller diameter of the elliptical shape. As a result, the spiral spring 80 is prevented from rotating during the relative movement between the support shaft 18 and the slot 20 and hence, the second portions 83 is assuredly maintained in sliding contact with the top plate 13.

Figure 5:
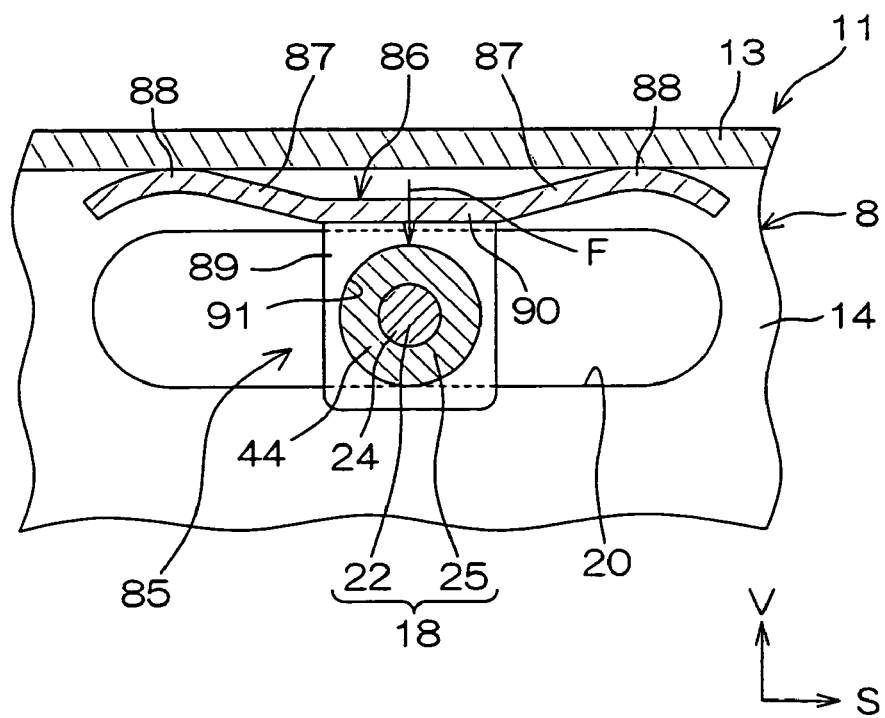
FIG. 5 is a sectional view showing a principal part of a vehicular steering apparatus according to still another embodiment of the invention.
Figure 6:
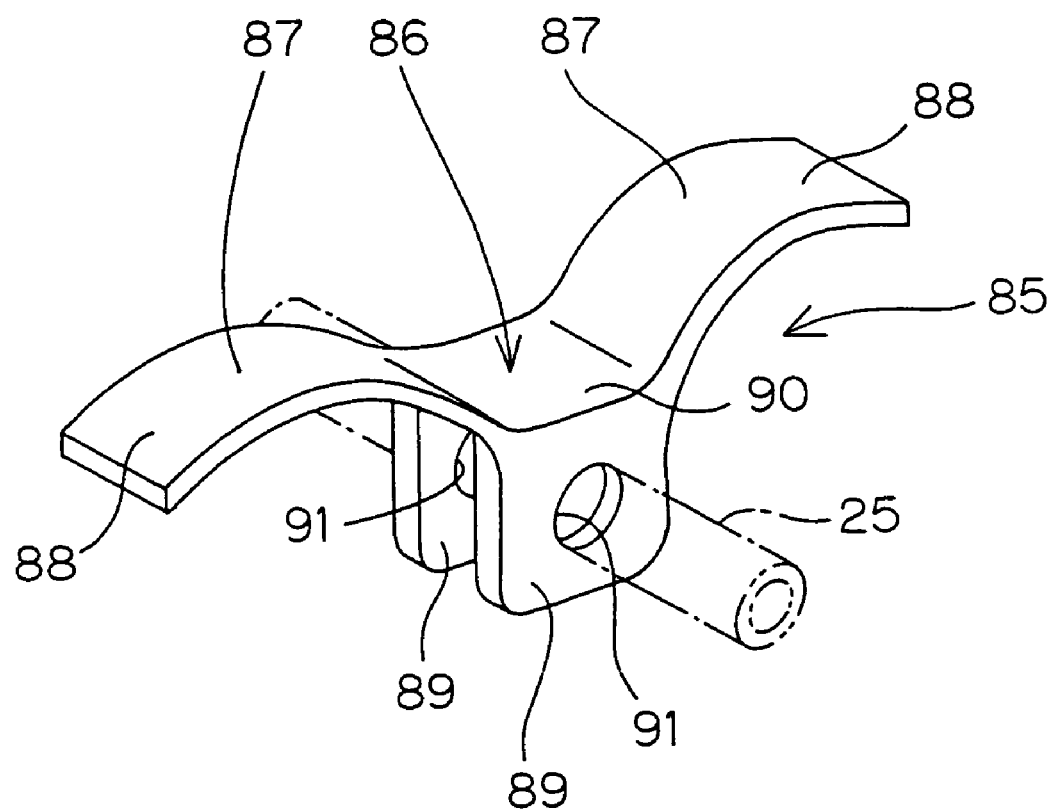
FIG. 6 is a perspective view showing a resilient member of the steering apparatus of FIG. 5.

Alternatively, a resilient member 85 of a leaf spring may be used, as shown in FIGS. 5 and 6. The resilient member 85 includes a main body 86 retained by the support shaft 18; and a pair of arm portions 87 of leaf spring extended from the main body 86 to resiliently contact the top plate 13. The arm portions 87 extend from the main body 86 in opposite directions and along the longitudinal direction S of the steering column 4. Each of the arm portions 87 defines a curved shape protruded toward the top plate 13.

The resilient member 85 is formed from a known resilient material such as a spring steel. The resilient member 85 is substantially shaped like 'Y' as viewed along the axis of the support shaft 18.

The arm portions 86 are each cantilevered by the main body 86 and each abut against the top plate 13 at a portion near a free end thereof. The outer shaft 25 of the support shaft 18 is fitted into a through hole 91 of the main body 86, whereby the resilient member 85 with its arm portions 87 subject to bending deformation is retained by the support shaft 18 in a manner to be movable unitarily with the support shaft 18. The arm portions 87 each exhibit a resilient repulsive force to bias the support shaft 18 via the main body 86 along a predetermined biasing direction F to move the support shaft 18 away from the top plate 13.

The arm portions 87 receive reaction forces from the top plate 13, which produce torques oppositely directed about the support shaft 18 so that the resilient member 85 is prevented from rotating about the support shaft 18 during the relative movement between the support shaft 18 and the slot 20.

The main body 86 defines a groove shape including a pair of side plates 89 each including the through hole 91, and a top plate 90 interconnecting upper ends of the side plates 89. There may be a case, for example, where the main body 86 and the pair of arm portions 87 are formed from a metal sheet as one piece. In this case, the resilient member 85 is formed of a metal-sheet work piece having a substantially developed shape of a cross.

Figure 7:
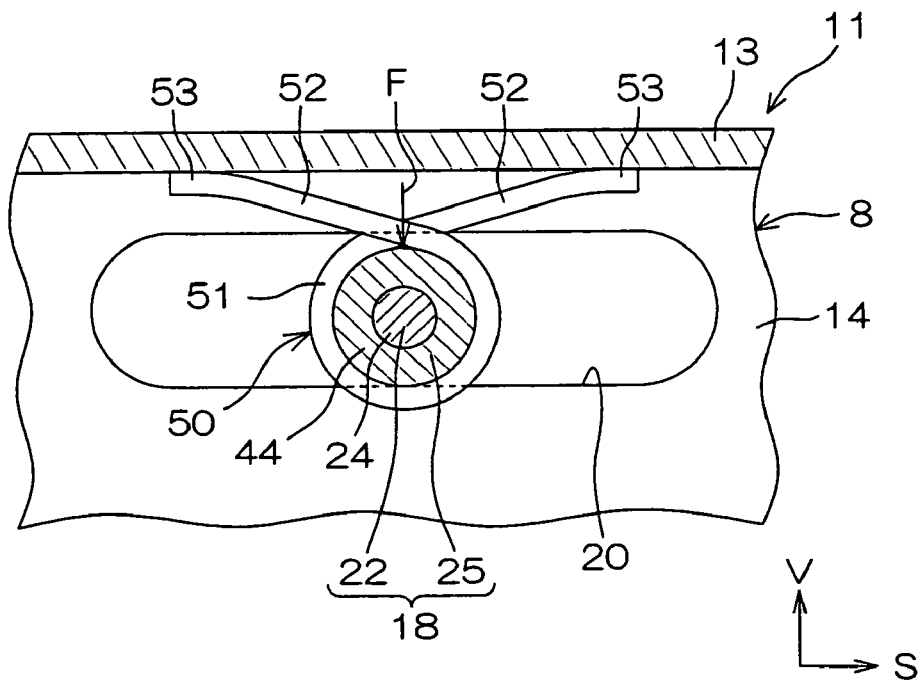
FIG. 7 is a sectional view showing a principal part of a vehicular steering apparatus according to still another embodiment of the invention.

FIG. 7 illustrates a torsion helical spring 50 as the resilient member. The torsion helical spring 50 is formed from a known resilient material such as a spring steel. The torsion helical spring 50 includes a helical portion 51 retained by the support shaft 18 as surrounding the same; and a pair of extension portions 52 each extended tangentially of the helical portion 51. The pair of extension portions 52 are extended generally in opposite ways to substantially define a V-shape, and along the longitudinal direction S of the steering column 4.

The extension portions 52 are cantilevered by the helical portion 51 and each abut against the top plate 13 at a free end thereof. The torsion helical spring 50 is so deformed as to increase the angle of the V-shape defined by the pair of extension portions 52. A resilient restoring force against the deformation is produced so that the torsion helical spring 50 biases the support shaft 18 along a predetermined biasing force F to move the support shaft 18 away from the top plate 13.

The extension portions 52 receive reaction forces from the top plate 13, which produce torques oppositely directed about the support shaft 18 so that the torsion helical spring 50 is prevented from rotating about the support shaft 18 during the relative movement between the support shaft 18 and the slot 20.

Figure 8:
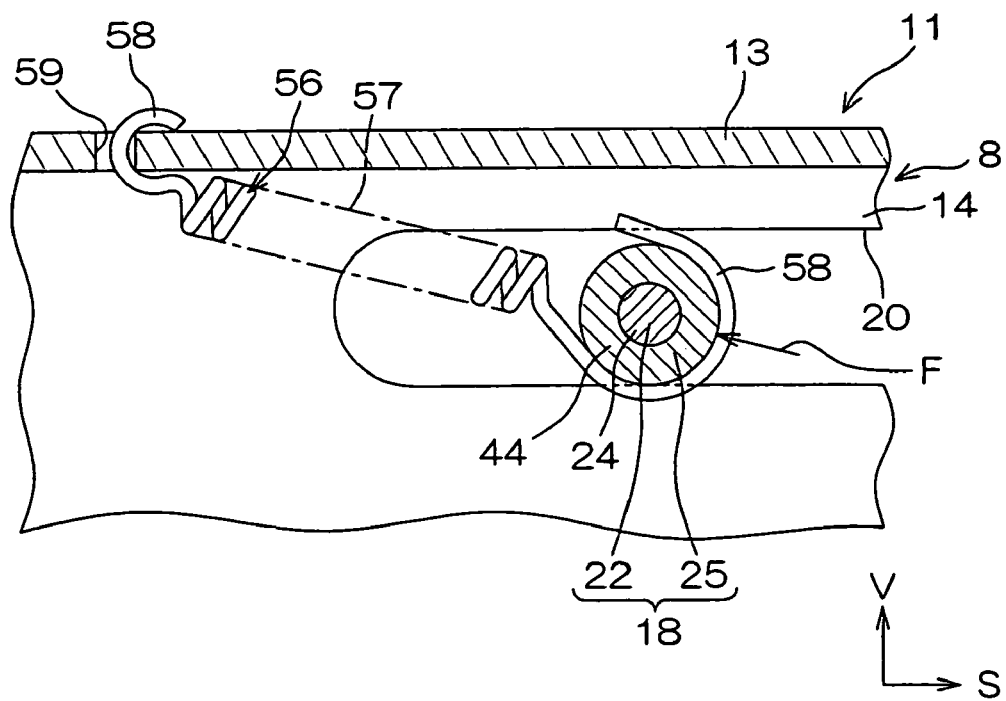
FIG. 8 is a sectional view showing a principal part of a vehicular steering apparatus according to still another embodiment of the invention.

As shown in FIG. 8, an extension spring 56 may be used as the resilient member. The extension spring 56 may be formed from a known resilient material such as a spring steel. The extension spring 56 includes an expandable helical main body 57. The extension spring 56 is formed with a pair of engaging portions 58 such as of hooks at opposite ends thereof.

The pair of engaging portions 58 of the extension spring 56 are individually hooked over the periphery of the outer shaft 25 of the support shaft 18 and through an engagement portion 59 such as of an engagement hole formed in the top plate 13. The extension spring 56 is stretched between the top plate 13 and the support shaft 18.

The engagement portion 59 formed in the top plate 13 is spaced away from the support shaft 18 with respect to the longitudinal direction S of the steering column 4. Specifically, a distance between the steering wheel 2 and the engagement portion 59 of the top plate 13 is greater than a distance between the steering wheel 2 and the support shaft 18.

A resilient restoring force of the extension spring 56 biases the support shaft 18 along a predetermined biasing direction F to move the support shaft 18 toward the engagement portion 59 of the top plate 13. The support shaft 18 is also biased along the longitudinal direction S of the steering column 4 by a component force of the biasing force acting along the predetermined biasing direction F.

According to the example shown in FIG. 8, the engagement hole is employed as the engagement portion 59 of the top plate 13. Alternatively, the engagement portion 59 may be, for example, an engagement projection over which the corresponding engaging portion 58 of the extension spring 56 can be hooked.

In addition, the distance between the steering wheel 2 and the engagement portion 59 of the top plate 13 may be smaller than the distance between the steering wheel 2 and the support shaft 18, or otherwise, these distances may be substantially equal to each other so that the engagement portion 59 confronts the support shaft 18.

Figure 9:
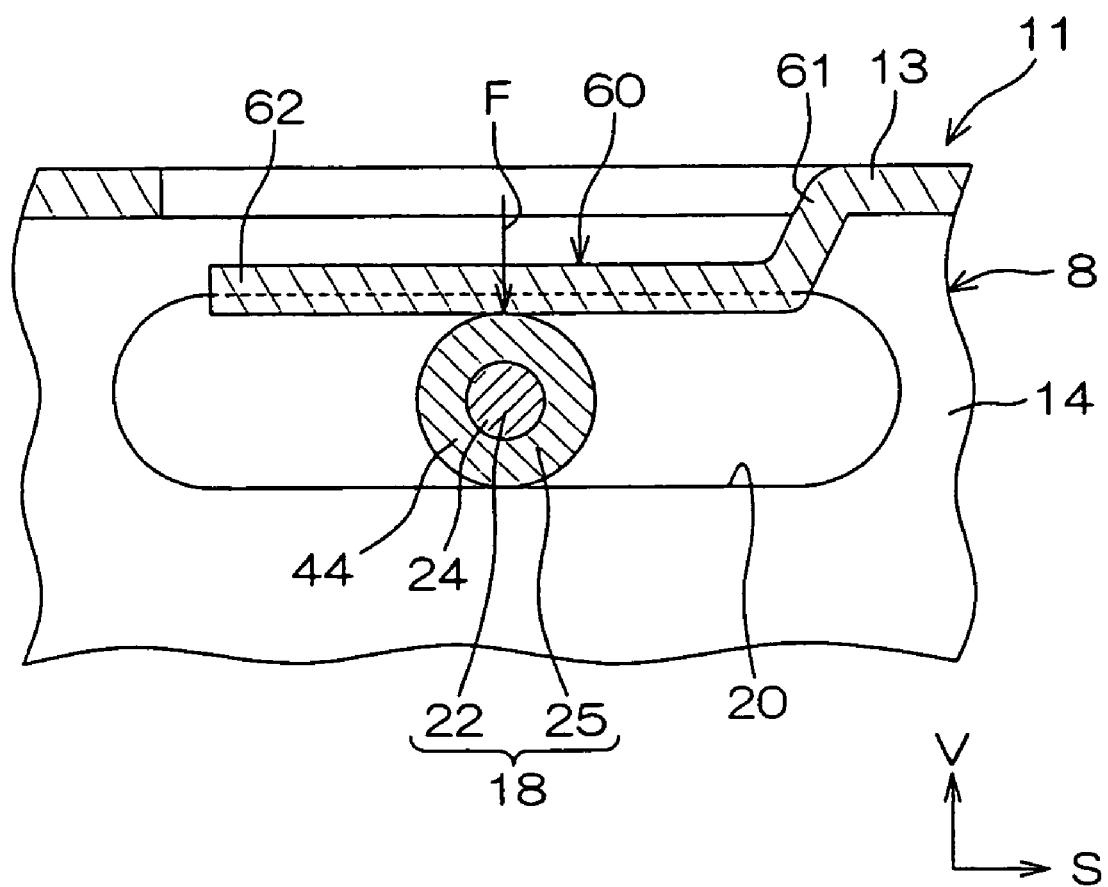
FIG. 9 is a sectional view showing a principal part of a vehicular steering apparatus according to still another embodiment of the invention.
Figure 10:
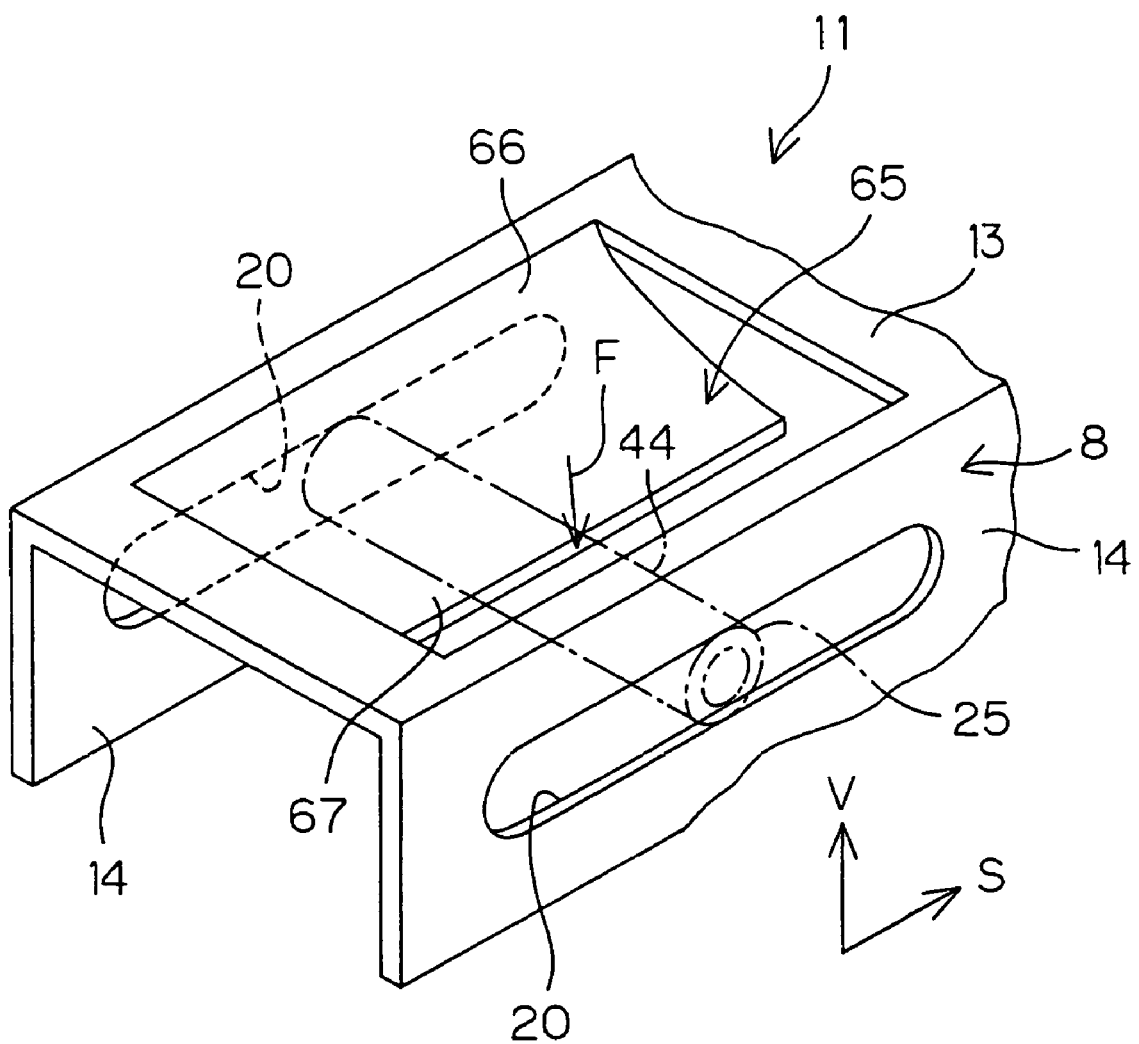
FIG. 10 is a perspective view showing a principal part of a vehicular steering apparatus according to still another embodiment of the invention.

Furthermore, as a resilient member for restricting the play of the support shaft 18, there may be used cantilever resilient tongues 60, 65 formed integrally with the top plate 13 of the lower column bracket 8 as shown in FIG. 9 or 10, or a resilient projection 70 protruded from the top plate 13.

The resilient projection 60 shown in FIG. 9 is fixed to the top plate 13 at one end 61 thereof, defining a free end at the other end thereof. Thus, the resilient projection is cantilevered by the top plate. The resilient projection 60 extends from the one end 61 thereof to the other end thereof along the longitudinal direction S of the steering column 4 so as to bias the axially intermediate portion 44 of the outer shaft 25 at its portion extending in parallel with the slot 20.

Similarly to the resilient projection 60 of FIG. 9, the resilient projection 65 shown in FIG. 10 is cantilevered. The resilient projection 65 extends from one end 66 thereof to the other end 67 thereof in parallel with the axial direction of the support shaft 18 and biases the axially intermediate portion 44 of the outer shaft 25 at the other end 67 thereof.

Figure 11:
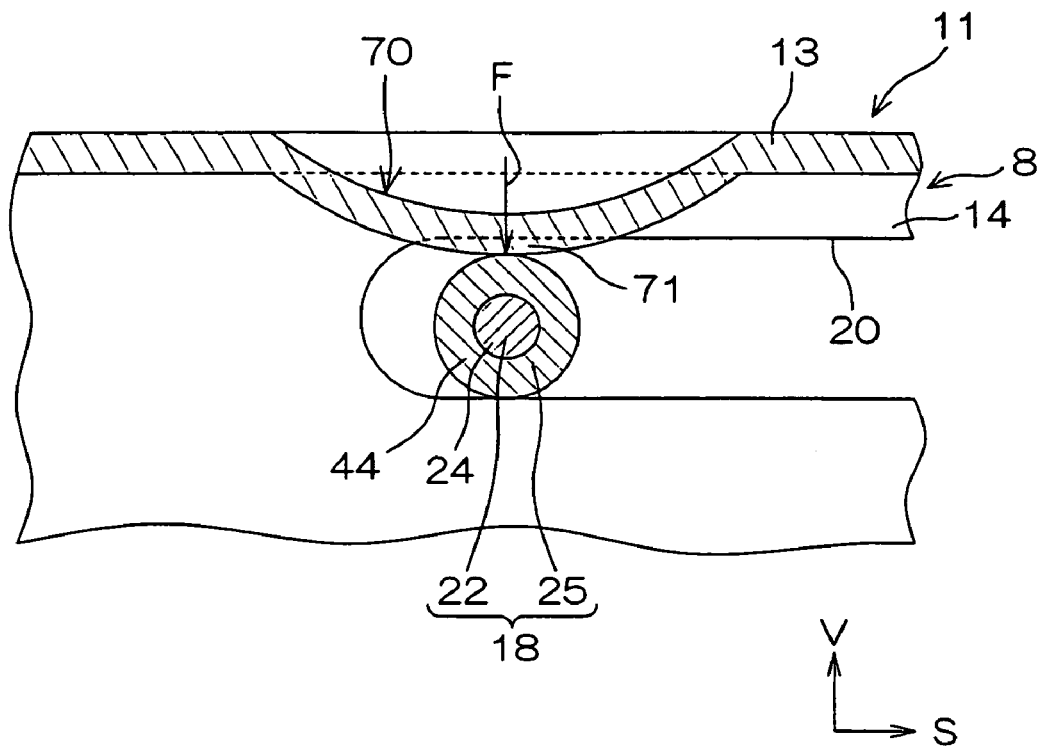
FIG. 11 is a sectional view showing a principal part of a vehicular steering apparatus according to still another embodiment of the invention.

The resilient projection 70 shown in FIG. 11 is formed by protruding a part of the top plate 13 toward the support shaft 18, and has a convex distal end 71 biasing the axially intermediate portion 44 of the outer shaft 25 of the support shaft 18.

According to the foregoing embodiments, the resilient members such as the annular member 45, spiral spring 80, resilient member 85, torsion helical spring 50, extension spring 56, resilient tongues 60, 65 and resilient projection 70 each have at least a part thereof resiliently deformed for biasing the support shaft 18, thereby preventing the unwanted play or rattle of the steering column 4. This will lead to the suppression of noises.

Furthermore, the resilient members 45, 80, 85, 50, 56 are each disposed at place where there is enough room therefor. Accordingly, it is not so difficult to accomplish a required amount of deformation of the resilient member for obviating the poor fit of the support shaft 18. This results in a stable resistance to the relative movement between the slot 20 and the support shaft 18 when the steering column 4 is moved along the longitudinal direction S thereof for positional adjustment of the steering wheel 2 or for absorption of an impact energy.

This also leads to the reduced variations in the resistance among the individual steering column assemblies 1 and thence, to the reduced variations in the amount of absorbed impact energy. Furthermore, it is ensured that a required shock-absorbing stroke is positively attained. In addition, the individual steering column assemblies 1 are less varied in the manipulation force to be applied for adjusting the position of the steering wheel 2 thereof.

Any of the above members 45, 80, 85, 50, 56 may be utilized to eliminate the poor fit and hence, the poor-fit eliminating collar of resin mentioned in the section of the related art, for example, may be omitted as in the foregoing embodiments. The omitted collar means the reduction of the number of components and the costs.

Where the annular member 45 is used as the poor-fit eliminating resilient member, for example, the annular member 45 may have a much greater size than the conventional resin collar singly inserted in the slot. Therefore, the annular member is decreased in the ratio of a required amount of deformation for poor-fit elimination relative to the size thereof.

As a result, it is ensured that the required amount of deformation for poor-fit elimination is achieved in a stable manner less affected by dimensional errors of the components such as the annular member 45. Hence, the resistance to the relative movement between the slot 20 and the support shaft 18 is not varied.

In contrast, the conventional example employs only the resin collar fitted in the slot as fitted on the support shaft for eliminating the poor fit of the support shaft in the slot. Since the resin collar is normally small in size, the collar has a great ratio of the required amount of deformation for poor-fit elimination relative to the size thereof. Consequently, the conventional example is significantly affected by the dimensional errors of the components, suffering great variations in the required amount of deformation and the resistance to the relative movement.

It is noted here that the required amount of deformation for poor-fit elimination means an amount of deformation to enable the poor-fit eliminating member to eliminate a clearance between the slot 20 and the support shaft 18 while accommodating clearance amount variations resulting from the dimensional errors. The same holds for the other resilient members 80, 85, 50, 65 besides the annular member 45.

It goes without saying that the working effect of the invention is also achieved in a case where each of the foregoing embodiments employs the corresponding one of the members 45, 80, 85, 50, 65 as the resilient member in combination with the conventional resin collar (not shown) fitted in the slot 20 as fitted on the periphery of the support shaft 18. That is, since the poor fit is obviated by the resilient member, there is no problem if a clearance exists between a periphery of the resin collar and the circumferential edge of the slot 20. Therefore, dimensional tolerance for the resin collar may be defined out of a range which results in an increased resistance to the relative movement between the slot and the support shaft. As a result, the variations of the resistance to the relative movement are decreased, so that the problem is solved.

The annular member 45, spiral spring 80, resilient member 85 and torsion helical spring 50 are preferred for preventing the poor fit of the support shaft 18 because these members can keep biasing the support shaft 18 as slidably contacting the top plate 13 when the steering column 4 is moved. These members, which are in friction contact with the top plate 13, are also able to absorb the shock during a collision.

The annular member 45 can roll or slide on the top plate 13 when the steering column 4 is moved. Accordingly, the annular member is preferred for stabilizing and reducing the resistance to the relative movement between the slot 20 and the support shaft 18. For instance, the annular member is preferably used for ensuring the required amount of shock-absorbing stroke during the shock absorption. Furthermore, the annular member permits a small manipulation force to move the steering column 4 along the longitudinal direction S thereof for positional adjustment of the steering wheel 2.

Where the extension spring 56 is employed, the poor fit of the support shaft 18 can be readily obviated by the extension spring 56. Particularly, the extension spring is capable of adjusting the position of the steering wheel 2 with respect to the longitudinal direction S of the steering column 4. In addition, where the engagement portion 59 of the top plate 13 is located farther away from the steering wheel 2 than the support shaft 18, the extension spring 56 receives a weight of the steering column 4 in place of an operator, thus reducing the manipulation force for manually moving the steering column 4 for positional adjustment.

In a case where the steering apparatus 1 does not have the function to permit the positional adjustment of the steering wheel 2 with respect to the longitudinal direction S of the steering column 4 or where the assembly 1 does not have the above function nor the tilt adjustment function, the support shaft 18 is designed to be moved in the slot 20 only when the shock is absorbed.

In a case where the steering apparatus 1 does not have the aforesaid shock absorbing function but has any other known shock absorbing mechanism at some other place therein, or where this assembly further omits the tilt adjustment function, the support shaft 18 is designed to be moved in the slot 20 only when the steering wheel 2 is adjusted for its position with respect to the longitudinal direction S of the steering column 4.

In addition, the outer shaft 25 of the support shaft 18 may be dispensed with so that the support shaft includes only the inner shaft 22.

Figure 12:
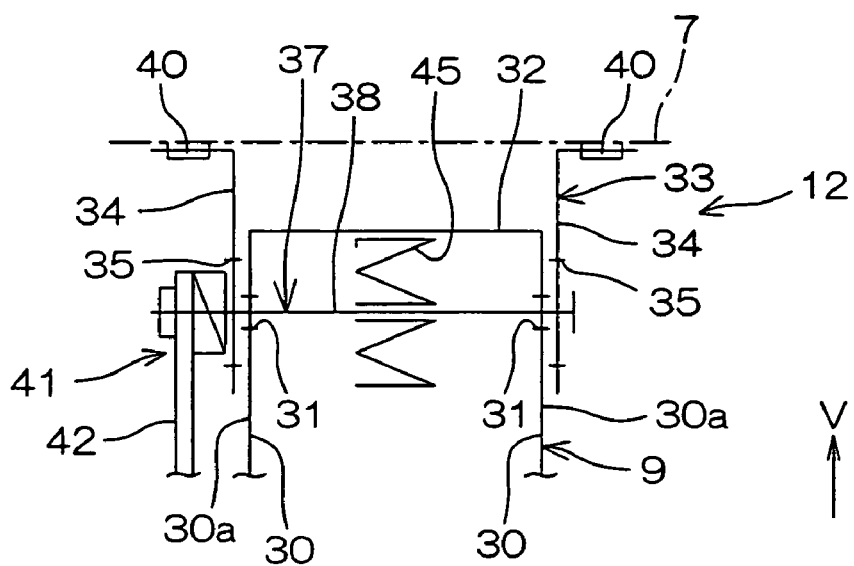
FIG. 12 is a sectional view showing a principal part of a vehicular steering apparatus according to still another embodiment of the invention.

It may be contemplated that any one of the above resilient members is provided at the support structure 12. Specifically, where the upper column bracket 9 of the support structure 12 defines a groove shape including a top plate 32 and the pair of side plates 30, as shown in FIG. 12, the above resilient member, such as the annular member 45 (schematically depicted in the figure), is interposed between an axially intermediate portion 38 of the support shaft 37 sandwiched between the pair of side plates 30 of the upper column bracket 9, and the top plate 32 of the upper column bracket 9, so that the resilient member may bias the support shaft 37 in a predetermined biasing direction F to restrict the poor fit of the support shaft 37 in the slots 31 as the support-shaft insertion holes formed in the side plates 30.

The pair of side plates 34 of the upper fixing bracket 33 each confront an outside face 30a of a corresponding one of the side plates 30 of the upper column bracket 9.

The support shaft 37 may have the same two-piece structure as the aforementioned support shaft 18 but may consist of a single solid bolt.

Where any of the above members 45, 80, 85, 50, 56 as the resilient member is provided at the support structure 12, the resilient member of the support structure 11 may be dispensed with.

While the invention has been specifically described by way of the specific examples thereof, modifications, changes or equivalents thereto will occur to those skilled in the art fully understanding the above description. The scope of the invention is therefore to be determined by the following claims and equivalents thereto.

This application is based on JP-A-2002-1374 filed with the Japan Patent Office on May 13, 20002, the disclosure of which is incorporated herein by reference.

The invention claimed is:

1. A vehicular steering apparatus comprising:
    a column bracket secured to a steering column including a top plate and a pair of side plates;
    a fixing bracket secured to a vehicle body and including a pair of side plates each of which confronts a face of a corresponding one of the side plate pair of the column bracket;
    a support shaft supported by the fixing bracket while supporting the column bracket;
    a support-shaft through hole formed in each of the side plates of the column bracket and the fixing bracket for insertion of the support shaft therethrough; the support-shaft through holes of the side plates of the column bracket each including a slot extended along a longitudinal direction of the steering column for permitting the support shaft to move relative thereto along the longitudinal direction of the steering column; and
    a single resilient member interposed between the top plate of the column bracket and a confronting portion of the support shaft and serving to bias the support shaft in a predetermined biasing direction to restrict play of the support shaft in the slot;
    wherein the single resilient member is integral with the top plate and comprises a partial deformation thereof, the single resilient member biases an axially intermediate a portion of the support shaft substantially equidistant from opposing ends thereof, and
    the predetermined biasing direction that the resilient member biases the support shaft is downward and in a direction that intersects with a plane including the longitudinal direction of the steering column and an axial direction of the support shaft.

2. A vehicular steering apparatus according to claim 1, wherein the resilient member includes a cantilevered resilient tongue formed at the top plate of the column bracket.

3. A vehicular steering apparatus according to claim 1, wherein the resilient member includes a resilient projection protruded from the top plate of the column bracket.

4. A vehicular steering apparatus according to claim 1, wherein the support shaft includes a hollow outer shaft and an inner shaft inserted through the outer shaft, the resilient member engages the outer shaft, and the outer shaft is held between the pair of side plates of the fixing bracket.

* * * * *